(12) United States Patent
Matsuoka et al.

(10) Patent No.: US 8,707,873 B2
(45) Date of Patent: Apr. 29, 2014

(54) BODYSHELL STRUCTURE OF RAILCAR

(75) Inventors: Masayasu Matsuoka, Osaka (JP);
Hiroyuki Kido, Osaka (JP); Taro Hayashi, Osaka (JP); Makoto Taguchi, Kobe (JP); Toshiyuki Yamada, Kobe (JP); Naoaki Kawakami, Kobe (JP); Yasufumi Minamimoto, Kobe (JP); Taro Oka, Kobe (JP); Yoshiyuki Yamada, Kobe (JP)

(73) Assignees: West Japan Railway Company, Osaka (JP); Kawasaki Jukogyo Kabushiki Kaisha, Kobe (JP)

( * ) Notice: Subject to any disclaimer, the term of this patent is extended or adjusted under 35 U.S.C. 154(b) by 178 days.

(21) Appl. No.: 13/257,212

(22) PCT Filed: Mar. 25, 2010

(86) PCT No.: PCT/JP2010/002150
§ 371 (c)(1),
(2), (4) Date: Nov. 25, 2011

(87) PCT Pub. No.: WO2010/109890
PCT Pub. Date: Sep. 30, 2010

(65) Prior Publication Data
US 2012/0125225 A1    May 24, 2012

(30) Foreign Application Priority Data

Mar. 25, 2009 (JP) ................................. 2009-073526

(51) Int. Cl.
*B61D 17/00* (2006.01)

(52) U.S. Cl.
USPC ......................................................... 105/410

(58) Field of Classification Search
USPC ............... 105/238.1, 355, 396, 404, 409–411
See application file for complete search history.

(56) References Cited

U.S. PATENT DOCUMENTS

| | | | | |
|---|---|---|---|---|
| 3,791,312 | A | * 2/1974 | Snyder et al. | .................. 105/423 |
| 2008/0060544 | A1 | 3/2008 | Kawasaki et al. | |

FOREIGN PATENT DOCUMENTS

| | | |
|---|---|---|
| CN | 101138981 A | 3/2008 |
| JP | A-43-017292 | 7/1968 |

(Continued)

OTHER PUBLICATIONS

International Search Report in International Application No. PCT/JP2010/002150; dated Jun. 15, 2010 (with English-language translation).

*Primary Examiner* — R. J. McCarry, Jr.
(74) *Attorney, Agent, or Firm* — Oliff PLC

(57) ABSTRACT

A bodyshell of a railcar includes side outside plates and end bodyshells. The side outside plates are respectively provided at both end portions of an underframe in a vehicle width direction. The end bodyshell includes end outside plates and corner posts. The end outside plates are respectively provided at front and rear end portions of the underframe. The corner posts are respectively provided at four corners of the underframe and are joined to the end outside plates and the side outside plates. Moreover, the corner post includes a side plate joining portion. The side plate joining portion overlaps a front end portion of the side outside plates from an outer side in the vehicle width direction and is joined to the side outside plate.

5 Claims, 9 Drawing Sheets

(56) References Cited

FOREIGN PATENT DOCUMENTS

| JP | U-53-113512 | 9/1978 |
| JP | A-56-138054 | 10/1981 |
| JP | A-2002-079939 | 3/2002 |
| JP | A-2004-106637 | 4/2004 |
| JP | A-2004-196170 | 7/2004 |
| JP | B2-3955807 | 8/2007 |
| JP | A-2008-062817 | 3/2008 |
| JP | A-2008-201313 | 9/2008 |

* cited by examiner

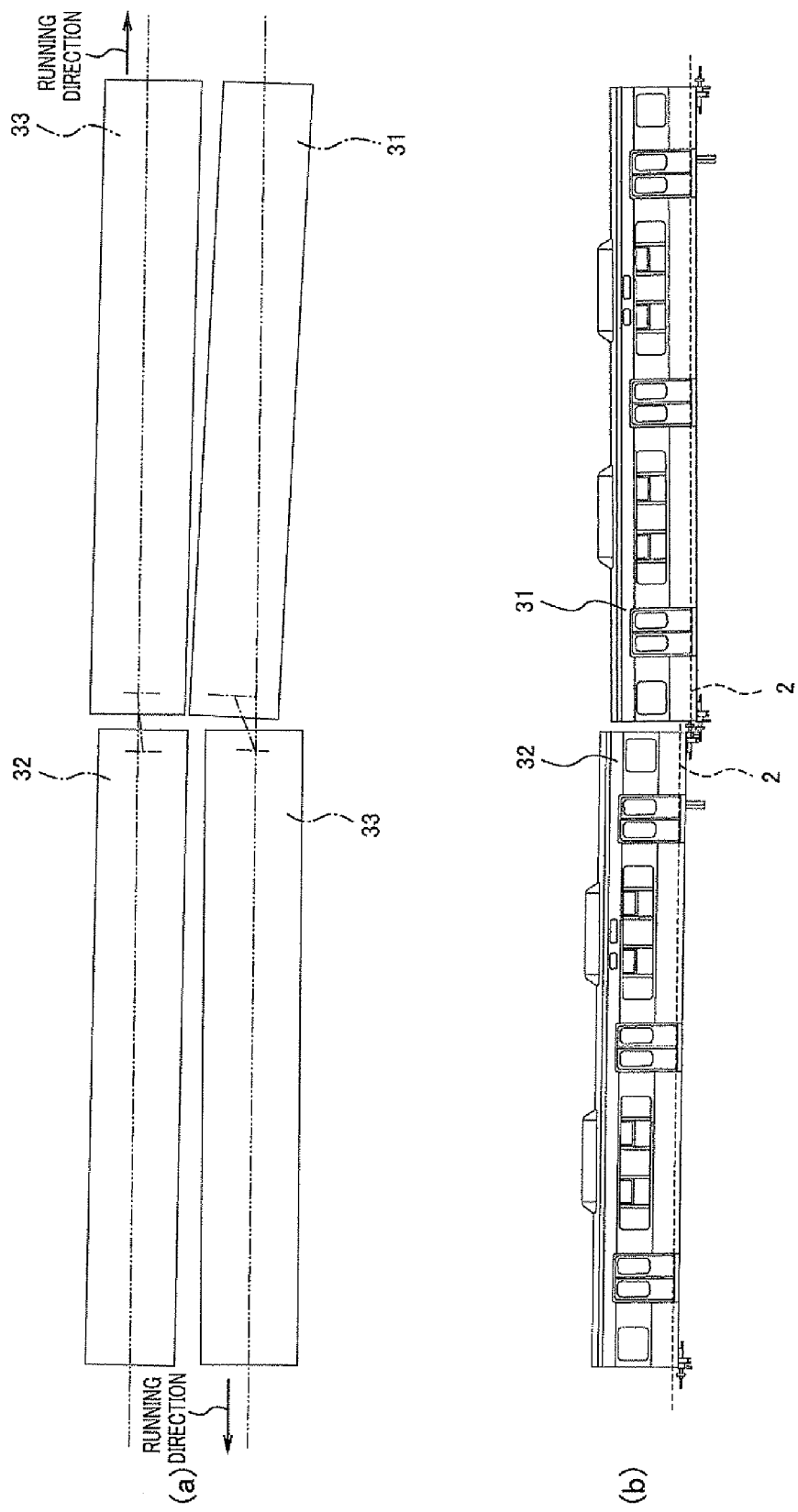

BODYSHELL STRUCTURE OF RAILCAR

TECHNICAL FIELD

The present invention relates to a bodyshell structure of a vehicle, such as a railcar, and particularly to a bodyshell structure of a railcar configured to have countermeasures to absorb the shock of an offset collision.

BACKGROUND ART

The offset collision denotes that in a case where two railcars 31 and 32 are running in directions opposite to each other, one vehicle (hereinafter may be referred to as an "oncoming vehicle") 31 derails from a track and collides with a part of the other vehicle (hereinafter may be referred to as a "running vehicle") 32 as shown in FIG. 9. Various countermeasures against the offset collision are being taken in railcars. As one example of the countermeasure against the offset collision, it is effective to configure a side bodyshell by using a double skin structure as in PTLs 1 and 2 to improve the stiffness of the side bodyshell or form an inclined surface at a front end portion of the side bodyshell of each of the vehicles 31 and 32 such that the vehicles 31 and 32 separate from each other at the time of the collision.

CITATION LIST

Patent Literature

PTL 1: Japanese Patent No. 3955807 (paragraph [0012] to [0014] and FIG. 4)
PTL 2: Japanese Laid-Open Patent Application Publication No. 2008-201313 (see FIGS. 3 and 6)

SUMMARY OF INVENTION

Technical Problem

The above-described double skin structure is applied to an aluminum alloy vehicle using aluminum alloy which is comparatively light in specific weight. Since a stainless steel vehicle using stainless steel which is heavy in specific weight than the aluminum alloy is heavy in weight, a single skin structure is commonly applied to the stainless steel vehicle. In order to facilitate steps of manufacturing the bodyshell of the single skin structure, an end outside plate to which corner posts have been joined in advance is attached to an underframe, and side outside plates are then attached to the underframe. At this time, a front end portion of the side outside plate is attached to the corner post so as to overlap the corner post from an outer side. Therefore, the front end portion of the side outside plate is exposed to the outside. As above, since the front end portion of the side outside plate is exposed to the outside, the front end portion of the side outside plate may be hooked at the time of the offset collision of the running vehicle 32, and the running vehicle 32 may keeps on running with the front end portion hooked. As a result, the side outside plate may be peeled off from the corner post.

Moreover, in the case of the single skin structure, unlike the double skin structure, the side outside plate and the corner post cannot be subjected to continuous welding by being placed face to face, and for example, the side outside plate needs to be welded to the corner post by spot welding. To be specific, the side outside plate and the corner post are joined to each other only by spots. Therefore, the problem is that as compared to the aluminum alloy vehicle disclosed in PTLs 1 and 2, the side outside plate of the stainless steel vehicle may be peeled at the time of the offset collision.

This problem seems to be a problem specific to the stainless steel vehicle to which the single skin structure is applied. However, the same problem occurs in the aluminum alloy vehicle if the side outside plate and the corner post overlap and are welded to each other and front and rear end portions of the side outside plate are exposed to the outside.

An object of the present invention is to provide a bodyshell structure of a railcar which has improved its safety against the offset collision.

Solution to Problem

A bodyshell structure of a railcar of the present invention includes: side outside plates respectively located at both end portions of a carbody in a vehicle width direction; and an end bodyshell including end outside plates respectively located at end portions of the carbody in a longitudinal direction and corner posts respectively located at four corners of the carbody and each joined to the adjacent side outside plate and the adjacent end outside plate, wherein a front end portion of the side outside plate is covered with the corner post from an outer side in the vehicle width direction.

In accordance with the present invention, since the front end portion of the side outside plate is covered by the corner post from the outer side, the front end portion of the side outside plate is protected so as not to be directly hit by the running vehicle at the time of the offset collision. Therefore, the front end portion of the side outside plate of the running vehicle is not hooked. Thus, the safety further improves.

Advantageous Effects of Invention

The present invention can provide a railcar which has further improved safety against the offset collision.

BRIEF DESCRIPTION OF DRAWINGS

FIG. 9 are diagrams showing a state where the offset collision of two railcars running in directions opposite to each other has occurred.
FIG. 9(a) is a plan view showing the railcars at the time of the offset collision when viewed from above,
and FIG. 9(b) is a diagram showing the railcars at the time of the offset collision when viewed from a right side.

DESCRIPTION OF EMBODIMENTS

Hereinafter, a bodyshell 1 of a railcar of an embodiment according to the present invention will be explained in reference to the drawings. A concept of directions described in respective embodiments corresponds to a concept of directions when a running direction of the railcar is defined as a front direction. The bodyshell 1 of the railcar explained below is just one embodiment of the present invention. The present invention is not limited to the embodiments below. Additions, eliminations, and modifications may be made within the spirit of the present invention.

Figure 1:
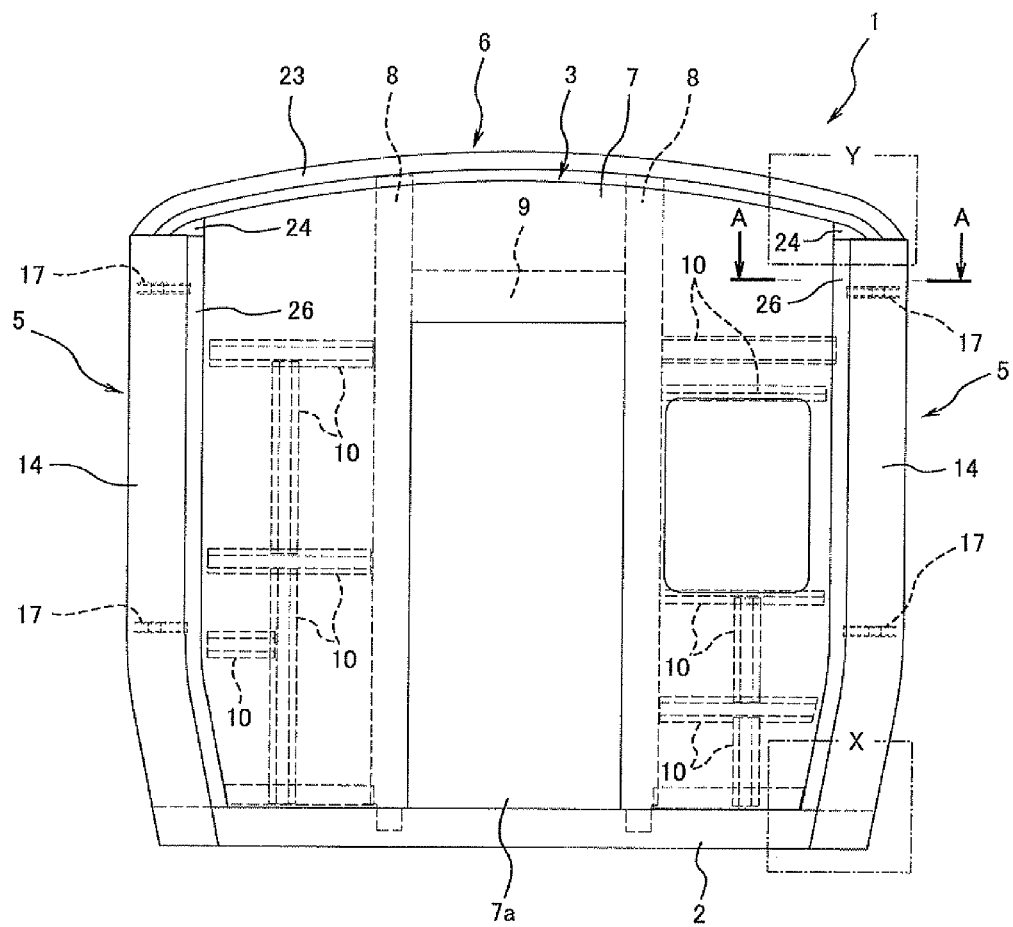
FIG. 1 is a front view of a bodyshell of a railcar of an embodiment according to the present invention when viewed from the front.

In the railcar, a plurality of vehicles are coupled to one another, and intermediate vehicles are included between a first vehicle and a last vehicle. Each vehicle includes two trucks (not shown) each configured to be capable of running on a track. In each vehicle, these two trucks are positioned to be spaced apart from each other in a longitudinal direction, and the bodyshell 1 is mounted on the trucks via air springs, not shown. The bodyshell 1 has a substantially hollow rectangular solid shape, that is, a box shape, and a space for accommodating passengers or cargoes is formed in the bodyshell 1. As shown in FIG. 1, the bodyshell 1 includes an underframe 2 at its bottom portion.

Underframe

The underframe 2 has a substantially rectangular shape in plan view and is mounted on the two trucks. Side bodyshells 4 respectively stand on both left and right end portions of the underframe 2, and end bodyshells 3 respectively stand on both front and rear end portions of the underframe 2. To be specific, the end bodyshells 3 are respectively positioned at both end portions of a carbody in a vehicle width direction, and the side bodyshells 4 are respectively positioned at both end portions of the carbody in a vehicle longitudinal direction. The end bodyshell 3 and the side bodyshell 4 adjacent to each other are connected to each other by a below-described corner post 5. Then, a roof bodyshell 6 is placed on the side bodyshells 4 and the end bodyshells 3. Thus, the underframe 2, the two side bodyshells 4 (see FIG. 2), the two end bodyshells 3, and the roof bodyshell 6 constitute the bodyshell 1 having the box shape.

Side Bodyshell

Figure 2:
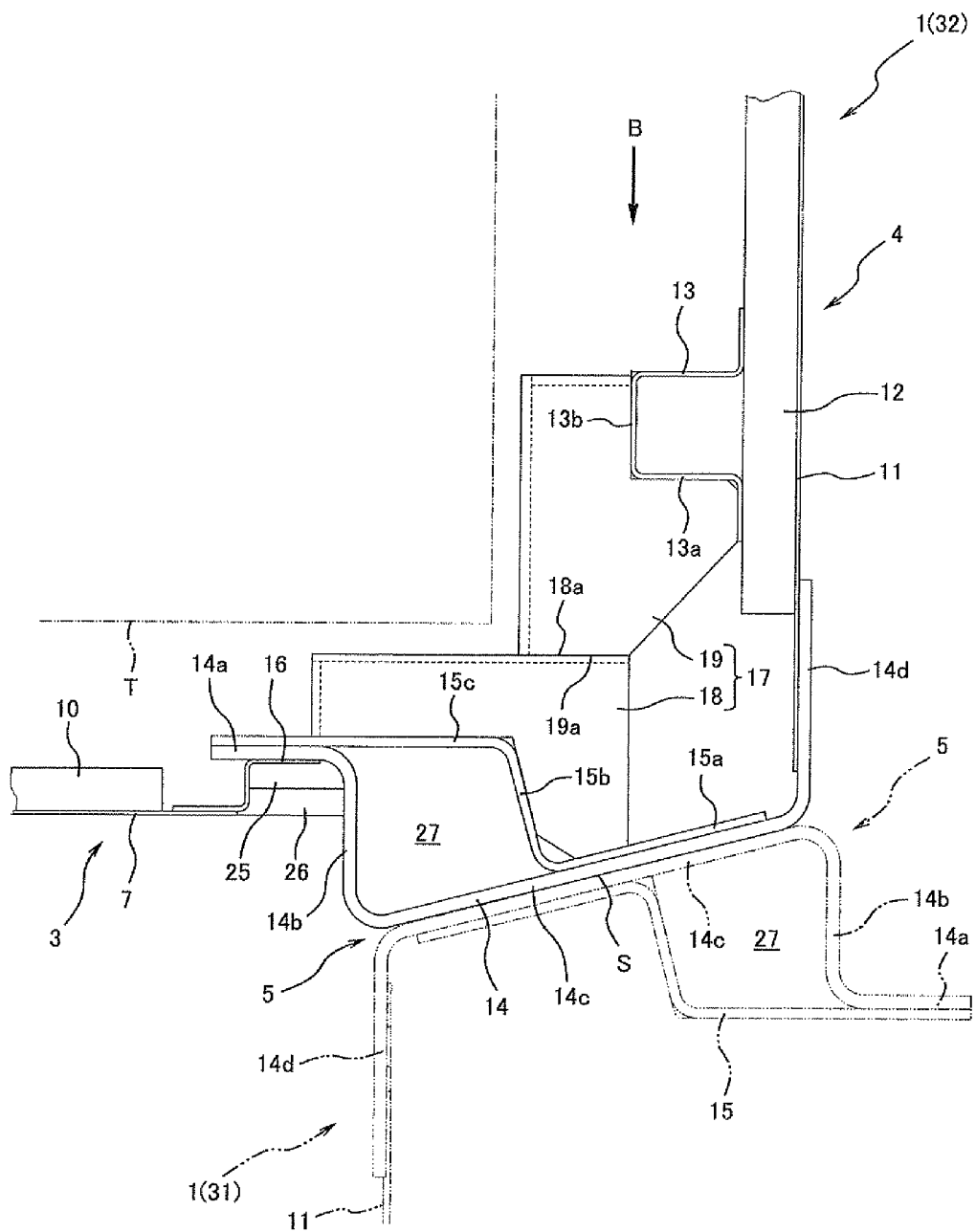
FIG. 2 is an enlarged cross-sectional view taken along line A-A of FIG. 1 and shows a part of the bodyshell.
Figure 3:
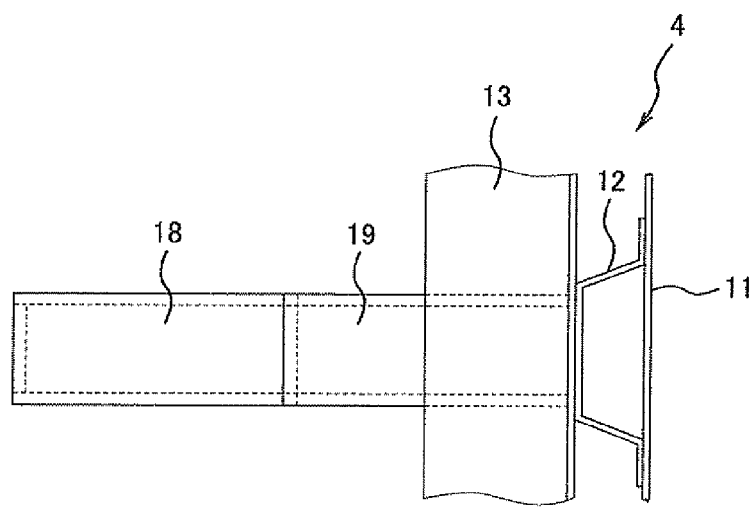
FIG. 3 is an enlarged view showing a part of the bodyshell when viewed from a direction indicated by an arrow B of FIG. 2.

As shown in FIG. 2, the side bodyshell 4 includes a side outside plate 11, a plurality of side longitudinal members 12, and a plurality of side posts 13. In a side view when viewed from a left side or a right side, the side outside plate 11 is a plate member which has substantially a long rectangular solid shape in a front-rear direction. In a front view, a lower portion of the side outside plate 11 is bent toward an inner side. A lower end of the side outside plate 11 is joined to the underframe 2, and an upper end thereof extends up to the roof bodyshell 6. A plurality of windows (not shown) are formed on the side outside plate 11. The plurality of side longitudinal members 12 and the plurality of side posts 13 are fixed to an inner side of the side outside plate 11 so as to avoid the windows. The side longitudinal member 12 is a frame member, such as a window head or a window sill, and extends in the front-rear direction. In the present embodiment, three side longitudinal members 12 are provided below the window, and one side longitudinal member 12 is provided above the window. The number of side longitudinal members 12 and the positions of the side longitudinal members 12 are not limited to the above number and positions. The side post 13 extends vertically and is provided over and fixed to the plurality of side longitudinal members 12.

End Bodyshell

The end bodyshell 3 includes an end outside plate 7, gangway posts 8, a door header 9, crosspiece members 10, an arched girder 23, and the corner posts 5. In a front view when viewed from the front, the end outside plate 7 is a plate member having a substantially inverted U shape and stands on the underframe 2. An upper end of the end outside plate 7 extends up to the below-described arched girder 23, and a hole located at a horizontally center portion of the end outside plate 7 forms a gangway 7a. The gangway posts 8 respectively stand on both sides of the gangway 7a along the gangway 7a, and the door header 9 is provided on an upper side of the gangway 7a. The gangway post 8 extends from the underframe 2 up to the arched girder 23, and the door header 9 extends horizontally so as to connect the two gangway posts 8. Moreover, a plurality of crosspiece members 10 having a hat-shaped cross section are provided on an inner side of the end outside plate 7 and on an outer side of the gangway post 8 to extend vertically and horizontally.

Corner Post

A pair of corner posts 5 are provided at each of both front and rear end portions of the underframe 2. To be specific, the corner posts 5 are respectively provided at four corners of the carbody. Further, each corner post 5 constitutes a part of the end bodyshell 3 and is joined so as to connect the side bodyshell 4 and a receiving metal 16 joined to the end bodyshell 3. Each corner post 5 is constituted by a guiding plate 14 and a supporting plate 15 which extend in the vertical direction. As described below, a lower end of the corner post 5 reaches up to a lower surface of the underframe 2 (see FIG. 4), and an upper end thereof reaches up to the arched girder 23 (see FIG. 6).

The railcar inverts its running direction in an outward route and a return route. Therefore, two corner posts 5 located on a rear side in the outward route are located on a front side in the return route. Therefore, in order to take the countermeasure against the offset collision in both the outward route and the return route, the corner posts 5 having the same shape are provided at four corners to realize front-rear symmetry and left-right symmetry. The following will explain the configurations of the corner posts 5 provided at both corners on the front side, and explanations of the configurations of two corner posts 5 provided on the rear side to realize the front-rear symmetry with the corner posts on the front side are omitted. FIGS. 2 to 7 show the corner post 5 provided at the left corner on the front side.

The guiding plate 14 that is a guide member is a plate-shaped member extending in the vertical direction and includes an end plate joining portion 14a, a coupling portion 14b, an inclined portion 14c, and a side plate joining portion 14d. In a plan view, the end plate joining portion 14a extends in a left-right direction (that is, in the vehicle width direction) and is provided behind the end outside plate 7. The receiving metal 16 is joined to a front surface of the end plate joining portion 14a, and the end plate joining portion 14a is joined to a left end portion of the end outside plate 7 (in the case of the corner post 5 at the right corner, a right end portion of the end outside plate 7) via the receiving metal 16. Moreover, the coupling portion 14b is connected to an outside end portion of the end plate joining portion 14a. Thus, the end plate joining portion 14a and the coupling portion 14b form an L shape in plan view. The coupling portion 14b extends in the front-rear direction, and a front end portion thereof projects forward of the end outside plate 7. Then, the inclined portion 14c is connected to the front end portion of the coupling portion 14b.

The inclined portion 14c extends from the front end of the coupling portion 14b toward an outer side in the vehicle width direction and inclines rearward toward the side outside plate 11. With this, an inclined surface S is formed on the inclined portion 14c. The inclined surface S extends from the end outside plate 7 side to the side outside plate 11 side and inclines rearward toward the side outside plate 11. Then, the side plate joining portion 14d is connected to an outside end portion of the inclined portion 14c. The side plate joining portion 14d has a substantially flat plate shape and extends rearward from the outside end portion of the inclined portion 14c. The side plate joining portion 14d except for its lower end portion overlaps a front end portion of the side outside plate 11 from the outer side and is joined to the front end portion of the side outside plate 11. To be specific, the front end portion of the side outside plate 11 is covered with the guiding plate 14 and is located on an inner side of the guiding plate 14.

The inclined portion 14c of the guiding plate 14 provided as above closes a gap between the end outside plate 7 and the side outside plate 11. The inclined portion 14c is located forward of the end outside plate 7 and inclines rearward from the end outside plate 7 side to the side outside plate 11 side. As above, the inclined portion 14c is located forward of the end outside plate 7. Therefore, even in the case of providing a below-described joining member 17, it is possible to prevent the inclined portion 14c from narrowing the space in the bodyshell 1 and to secure in the bodyshell 1 the space that is substantially the same in size as a space secured in a case where the inclined portion 14c is not formed.

Moreover, the gradient of the inclined surface S of the inclined portion 14c is set such that when a vehicle in front of the bodyshell 1 (hereinafter may be simply referred to as a "front vehicle"; see reference sign 33 in FIG. 9) yaws to the left and right, the inclined portion 14c of the bodyshell 1 and the inclined portion 14c of the front vehicle do not contact each other. Moreover, it is preferable that the width of the inclined surface S be such a width or wider that even if the front vehicle maximally yaws, only the inclined surface S is exposed to the front side and the end outside plate 7 is positioned behind the front vehicle.

The supporting plate 15 is provided on a rear surface of the guiding plate 14. The supporting plate 15 that is a supporting member is Z-shaped steel which is formed thinner than the guiding plate 14 and is a plate-shaped member extending in the vertical direction. The supporting plate 15 includes a first flange portion 15a, a web 15b, and a second flange portion 15c. The first flange portion 15a is joined so as to be attached to a rear surface of the inclined portion 14c. The web 15b is connected to an end portion of the first flange portion 15a which end portion is located on the end outside plate 7 side. The web 15b is provided orthogonal to the first flange portion 15a and extends rearward from the first flange portion 15a. Moreover, the second flange portion 15c is connected to a rear end portion of the web 15b. The second flange portion 15c extends from the web 15b up to the end outside plate 7 side, and its end portion located on the end outside plate 7 side is joined to a rear surface of the end plate joining portion 14a.

The supporting plate 15 joined as above is formed such that the first flange portion 15a is shorter than the inclined portion 14c and the second flange portion 15c is longer than the end plate joining portion 14a. Therefore, the web 15b is located to be spaced apart from the coupling portion 14b of the guiding plate 14 in the vehicle width direction, and a closed space 27 surrounded by the second flange portion 15c, the web 15b, the inclined portion 14c, and the coupling portion 14b is formed between the supporting plate 15 and the guiding plate 14. To be specific, the supporting plate 15 and the guiding plate 14 constitute a closed cross-section structure including the closed space 27.

Joining Member

A plurality of joining members 17 are provided on a rear surface of the supporting plate 15. In the present embodiment, two joining members 17 are provided to respectively correspond to the window head and the window sill, each of which is one of the side longitudinal members 12 of the side outside plate 11. The joining member 17 is a substantially hollow plate-shaped member. The joining member 17 is joined to the side post 13 that is a reinforcing member and is connected to the side longitudinal member 12 (the window head or the window sill) via the side post 13. Thus, the joining member 17 is interposed between the supporting plate 15 and the side longitudinal member 12 and supports the supporting plate 15 from the rear side.

The joining member 17 has a substantially L shape in a plan view. The joining members 17 are provided with a depressed portion located on the inner side so as not to interfere with four corners of an interior T in the vehicle, the interior T being formed in a substantially rectangular solid shape. The joining member 17 includes a first supporting portion 18 and a second supporting portion 19. Each of the first supporting portion 18 and the second supporting portion 19 has a U shaped cross section and opens to the front side and the side outside plate 11 side. The first supporting portion 18 has a substantially L shape in a plan view so as to correspond to the shapes of the second flange portion 15c and web 15b of the supporting plate 15 and is welded from the second flange portion 15c to the web 15b. Moreover, the second supporting portion 19 has a substantially L shape in a plan view so as to correspond to the shapes of a front arm 13a and web 13b of the side post 13 and is welded from the front arm 13a to the web 13b. Each of a joint surface 18a that is a rear surface of the first supporting portion 18 and a joint surface 19a that is a front surface of the second supporting portion 19 is flat and is located substantially perpendicular to the front-rear direction. That is, these two joint surfaces 18a and 19a extend in the vehicle width direction. The first supporting portion 18 and the second supporting portion 19 are welded to each other such that these two joint surfaces 18a and 19a face each other.

Other Configurations

Figure 4:
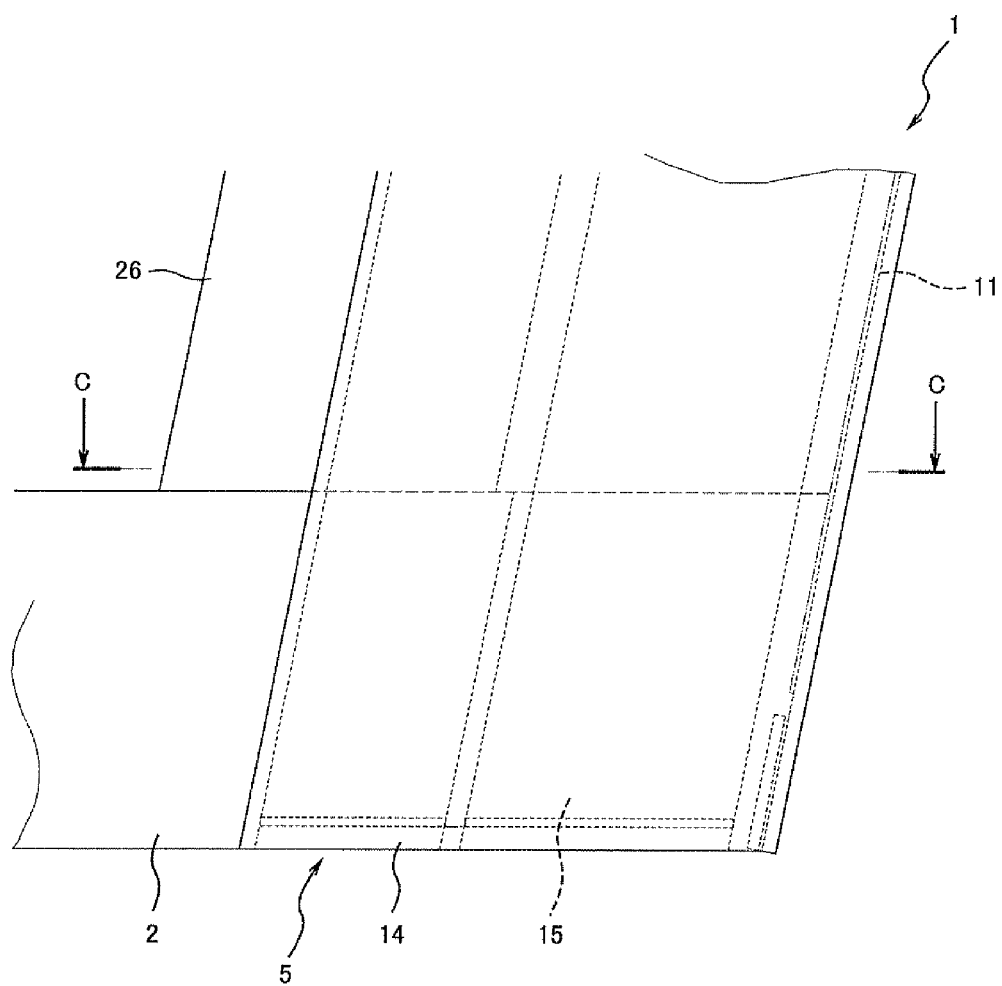
FIG. 4 is an enlarged front view of a region X of FIG. 1 and shows a part of the bodyshell.
Figure 5:
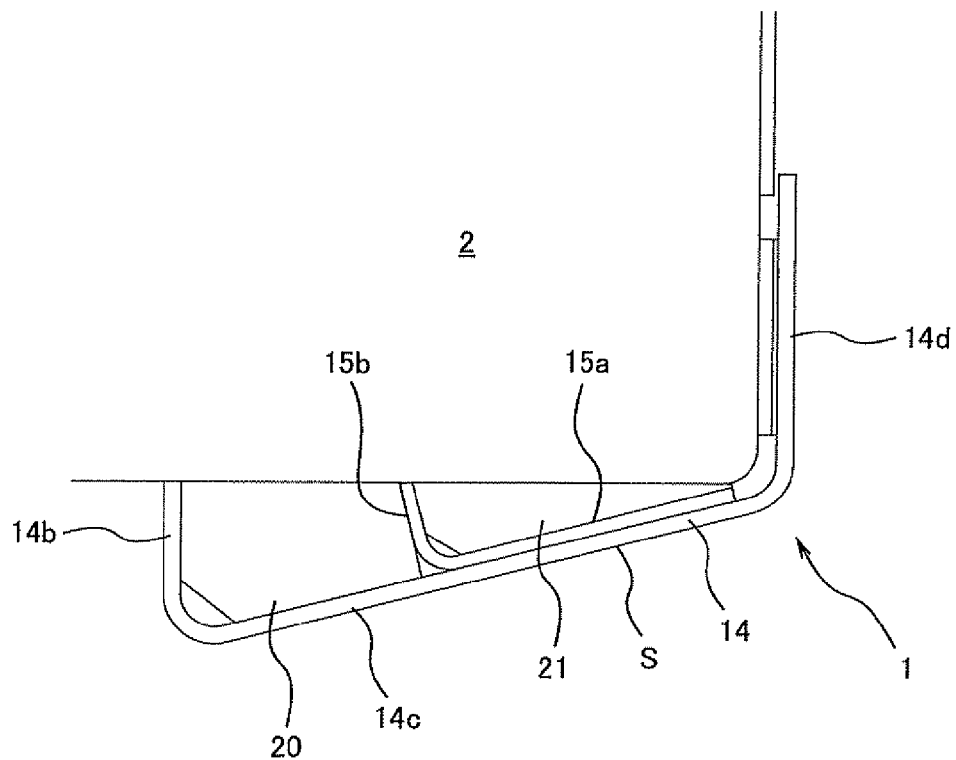
FIG. 5 is an enlarged cross-sectional view taken along line C-C of FIG. 4 and shows a part of the bodyshell.

Lower ends of the corner posts 5 configured as above reach a lower end of the underframe 2 as shown in FIG. 4. Thus, the lower end portions of the corner posts 5 respectively cover four corners of the underframe 2. Therefore, the lower end portion of the corner post 5 is slightly different in configuration from the other portion, and the configuration thereof will be explained in reference to FIG. 5. On a lower end side, the coupling portion 14b of the guiding plate 14 is cut at a position where the coupling portion 14b contacts the upper surface of the underframe 2, and lacks a portion from this position up to the end plate joining portion 14a. Then, the coupling portion 14b is welded to the underframe 2. Moreover, the web 15b of the supporting plate 15 is also cut at a position where the web 15b contacts the upper surface of the underframe 2, and lacks a portion from this position up to the second flange portion 15e. Then, the web 15b is welded to the underframe 2. Moreover, closure plates 20 and 21 are respectively provided at lower ends of the guiding plate 14 and the supporting plate 15. The closure plates 20 and 21 respectively close a gap between the guiding plate 14 and the underframe 2 and a gap between the supporting plate 15 and the underframe 2.

Figure 6:
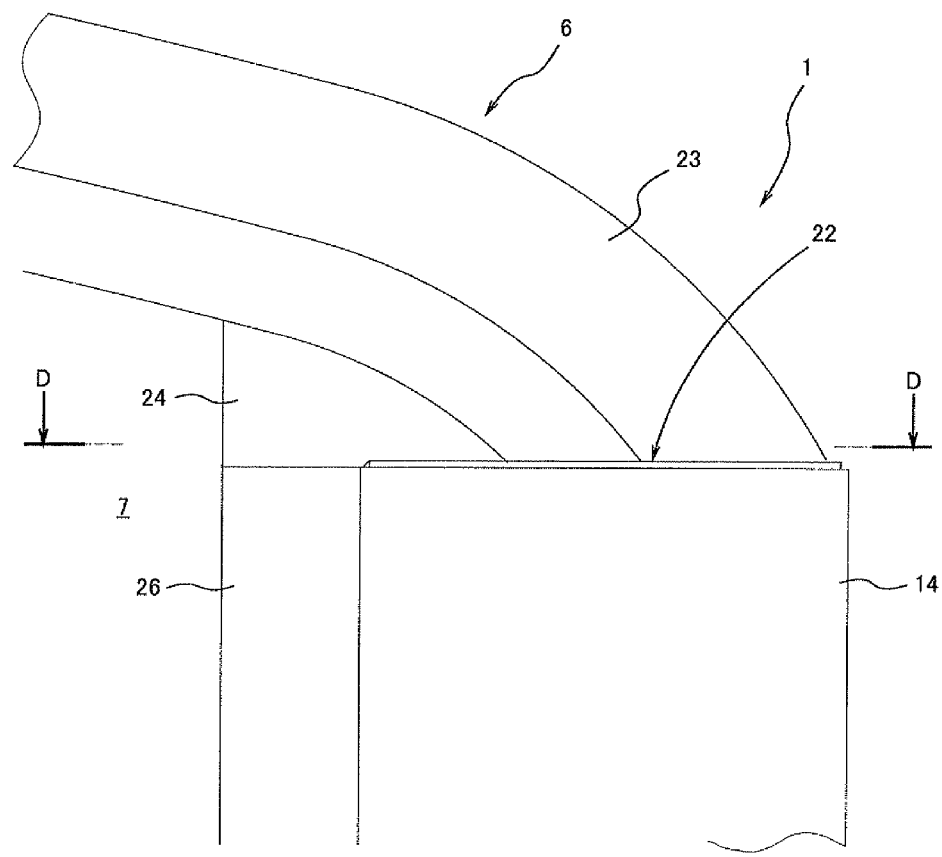
FIG. 6 is an enlarged front view of a region Y of FIG. 1 and shows a part of the bodyshell.
Figure 7:
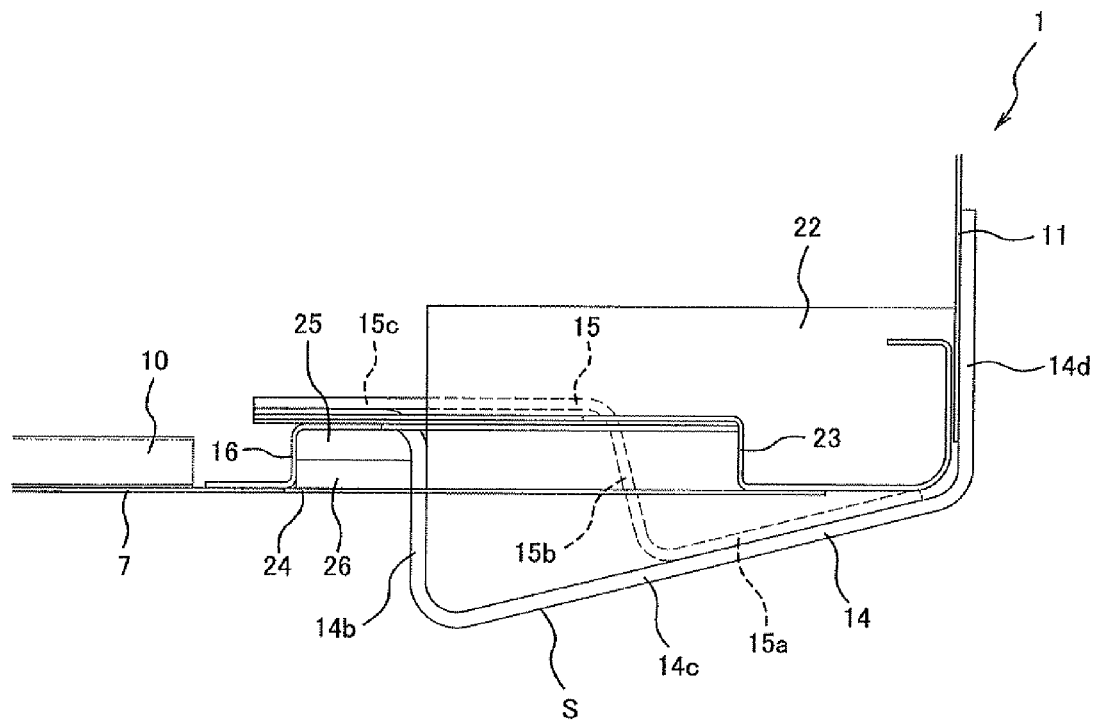
FIG. 7 is an enlarged cross-sectional view taken along line D-D of FIG. 6 and shows a part of the bodyshell.

As shown in FIG. 6, a closing plate 22 is provided on an upper end of the corner post 5. The closing plate 22 has a substantially trapezoid shape in a plan view and is provided from the coupling portion 14b of the guiding plate 14 to the front end portion of the side outside plate 11. The closed space 27 is closed by the closing plate 22, and the arched girder 23 is joined to an upper surface of the closing plate 22. The arched girder 23 is formed in an arch shape and extends to connect the corner posts 5 respectively located on the left and right sides. Moreover, an upper end of the end outside plate 7 is formed to have the shape of the arched girder 23 and is joined to a lower side of the arched girder 23. Then, a substantially triangular gap surrounded by the corner post 5, the arched girder 23, and the end outside plate 7 is formed on an outer side of each of left and right shoulder portions of the end outside plate 7, and a closure plate 24 formed to correspond to the shape of the gap is provided on the end outside plate 7 to close the gap. Moreover, a groove 25 extending in the vertical direction is formed between the end outside plate 7 and the coupling portion 14b of the guiding plate 14. A closure plate 26 is provided at an opening of the groove 25. Thus, the opening of the groove 25 is closed by the closure plate 26. The groove 25 is like a counterbore groove for storing, for example, a head portion of a bolt fastening the end outside plate 7 and the guiding plate 14.

Method for Assembling Bodyshell

Hereinafter, a method for assembling the bodyshell 1 will be schematically explained. First, the corner posts 5 are respectively joined to left and right end portions of the end outside plate 7 of the end bodyshell 3. Then, the end bodyshell 3 is attached to the underframe 2, and the side bodyshell 4 is then attached to the underframe 2. Here, in a conventional bodyshell structure in which the corner post is provided on an outer side of the side outside plate, after the end bodyshell is attached to the underframe 2 to stand on the underframe 2, the side bodyshell is attached to the underframe 2 so as to overlap the end bodyshell from the outer side. However, in accordance with a conventional method, unlike the present embodiment, the side bodyshell 4 cannot be provided on an inner side of the corner post 5. Here, when assembling the bodyshell 1 of the present embodiment, the end bodyshell 3 is temporarily assembled to the underframe 2 and slightly inclined to the outer side, the side bodyshell 4 is then attached to the underframe 2 to stand on the underframe 2, and the end bodyshell 3 stands on the underframe 2. With this, the front end portion of the side outside plate 11 is provided on an inner side of the side plate joining portion 14d.

After the end bodyshell 3 and the side bodyshell 4 are attached to the underframe 2 to stand on the underframe 2, the side plate joining portion 14d and the side outside plate 11 are joined to each other. Further, the first supporting portion 18 attached to the corner post 5 in advance and the second supporting portion 19 attached to the side bodyshell 4 in advance are welded to each other to form the joining member 17 between the corner post 5 and the side bodyshell 4. After forming the joining member 17, the roof bodyshell 6 is mounted on the end bodyshell 3 and the side bodyshell 4, and the closure plates 20, 21, 24, and 26 and the closing plate 22 close respective gaps. Thus, the bodyshell 1 is assembled.

In the bodyshell 1 assembled as above, only by welding the first supporting portion 18 attached to the corner post 5 in advance and the second supporting portion 19 attached to the side bodyshell 4 in advance, the joining member 17 is attached to between the corner post 5 and the side bodyshell 4. Therefore, the attachment of the joining member 17 is easy. Moreover, since each of the joint surface 18a of the first supporting portion 18 and the joint surface 19a of the second supporting portion 19 is perpendicular to the vehicle longitudinal direction and extends in the vehicle width direction, a position where two joint surfaces 18a and 19a face each other can be adjusted in accordance with relative positions of the supporting plate 15 and the side post 11. Therefore, it is easy to cause two joint surfaces 18a and 19a to face each other.

Offset Collision

Hereinafter, a case where the offset collision of two vehicles 31 and 32 each including the bodyshell 1 has occurred will be explained in reference to FIGS. 2 and 9. In a case where two vehicles 31 and 32 are running on the tracks in directions opposite to each other, one vehicle (hereinafter may be simply referred to as an "oncoming vehicle") 31 may derail from the track, and the offset collision of the oncoming vehicle 31 and the other vehicle (hereinafter may be simply referred to as a "running vehicle") 32 may occur. In this offset collision, the end outside plate 7 of the bodyshell 1 of the vehicle 31 is positioned behind the front vehicle 33, and the end outside plate 7 of the bodyshell 1 of the vehicle 32 is positioned behind the front vehicle 33. Therefore, the corner post 5 of the vehicle 31 and the corner post 5 of the vehicle 32 collide with each other (see FIG. 9(a)).

Since the corner posts 5 collide with each other, a heavy collision load is applied to each corner post 5. The corner post 5 is constituted by the closed cross-section structure, formed as a hollow post, and reinforced by the support of the joining member 17 from the rear side. Therefore, the bodyshell 1 has higher stiffness than the bodyshell of the conventional railcar. Therefore, the deformation of the corner post 5 at the time of the offset collision can be suppressed, and the peel-off of the side outside plate 11 due to the deformation of the corner post 5 can be prevented.

Each of the oncoming vehicle 31 and the running vehicle 32 which collide with each other at the corner posts 5 fends off the other vehicle by the inclined portion 14c in a direction away from its own vehicle. To be specific, the oncoming vehicle 31 is fended off by the inclined portion 14c of the running vehicle 32 in a direction away from the running vehicle 32, and the running vehicle 32 is fended off by the inclined portion 14c of the oncoming vehicle 31 in a direction away from the oncoming vehicle 31. By fending off each other, the collision load applied to each of the oncoming vehicle 31 and the running vehicle 32 can be suppressed, and a shear force applied at the time of the collision to a joining portion where the side outside plate 11 and the side plate joining portion 14d are joined to each other can be suppressed. Moreover, the shear force is suppressed by transferring a part of the collision load to the vehicle width direction by the inclined portion 14c. As above, the inclined portion 14c suppresses the shear force applied to the joining portion to prevent the side outside plate 11 from being peeled off from the corner post 5.

Further, by transferring the collision load to the vehicle width direction, the guiding plate 14 of the corner post 5 is pressed to the inner side in the vehicle width direction by the transferred force. Since the guiding plate 14 is pressed to the inner side in the vehicle width direction, the side plate joining portion 14d is pressed against the side outside plate 11. With this, the peel-off of the side outside plate 11 from the corner post 5 at the time of the collision is further suppressed.

In order to obtain an effect of preventing the peel-off, it is desirable that each of the oncoming vehicle 31 and the running vehicle 32 include the bodyshell 1. However, at least one of the oncoming vehicle 31 and the running vehicle 32 may include the bodyshell 1 of the present embodiment.

After the collision, the oncoming vehicle 31 and the running vehicle 32 are separated from each other by the inclined portions 14c up to a position where the corner post 5 of the oncoming vehicle 31 and the corner post 5 of the running vehicle 32 do not contact each other. Then, the vehicles 31 and 32 run in directions opposite to each other such that one of the vehicles 31 and 32 runs along the side plate joining portion 14d of the other vehicle 31 or 32. The front end portion of the side outside plate 11 is provided on the inner side of the side plate joining portion 14d and is located in the bodyshell 1. With this, the front end portion of the side outside plate 11 is protected by the corner post such that each of the oncoming vehicle 31 and the running vehicle 32 running along the side plate joining portion 14d does not directly hit the front end portion of the side outside plate 11 of the other vehicle. Therefore, each of the oncoming vehicle 31 and the running vehicle 32 does not hook the side outside plate 11 of the other vehicle and does not peel off the side outside plate 11 from the corner post 5. To be specific, since the side plate joining portion 14d overlaps the front end portion of the side outside plate 11 from the outer side, it is possible to prevent each of the oncoming vehicle 31 and the running vehicle 32 from hooking the front end portion of the side outside plate 11 and peeling off the side outside plate 11 from the corner post 5. Thus, the safety further improves.

Moreover, since the oncoming vehicle 31 which causes the offset collision derails, it collides with the running vehicle 32 from a position lower than the running vehicle 32 (see FIG. 9(b)). Therefore, at the time of the offset collision, the underframe 2 of the running vehicle 32 is higher in position than the underframe 2 of the oncoming vehicle 31. However, since the corner post 5 extends up to the lower end of the underframe 2, the underframe 2 having high stiffness is prevented from directly hitting the corner post 5 of the other vehicle. With this, the damage of the corner post 5 of the oncoming vehicle 31 at the time of the offset collision can be suppressed.

Other Embodiments

Figure 8:
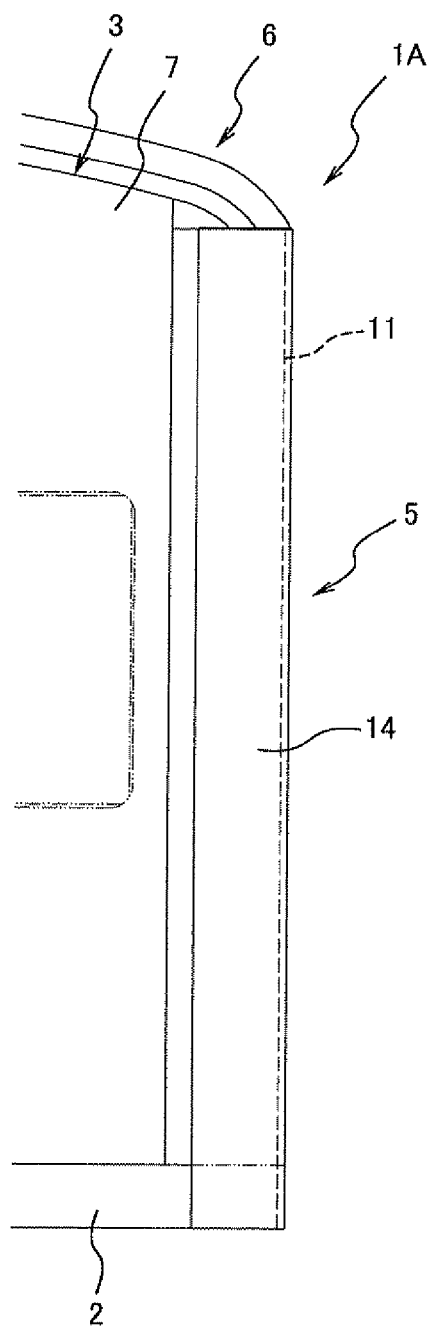
FIG. 8 is a partial front view showing the vicinity of a corner post of the bodyshell of the railcar of another embodiment according to the present invention when viewed from the front.

In the present embodiment, the lower portion of each of the side bodyshell 4 and the corner post 5 is bent toward the inner side. However, the lower portion may have a straight shape, such as the shape of a bodyshell 1A shown in FIG. 8. Moreover, in the present embodiment, the corner post 5 extends up to the lower end of the underframe 2. However, the corner post 5 does not have to extend up to the lower end of the underframe 2. Further, in the present embodiment, a plurality of side longitudinal members 12 are provided on the inner surface of the side outside plate 11 to reinforce the side outside plate 11. However, an inner plate on which a plurality of convex portions extending in the front-rear direction are formed may be provided on the inner side of the side outside plate 11 to reinforce the side outside plate 11. Moreover, the shape of the joining member 17 is not limited to the above-described shape, and may have any shape as long as the joining member can support the corner post 5 from the rear side. Then, the members to which the joining member 17 is joined are not limited to the side post 13 and the supporting plate 15. The joining member 17 may be directly joined to the side longitudinal member 12 or the guiding plate 14.

The bodyshell 1 of the present embodiment is applicable to not only the stainless steel vehicle to which the single skin structure is applied but also the aluminum alloy vehicle to which the double skin structure is applied, and the material of the vehicle does not matter. Moreover, the joining method is not limited to the present embodiments. Moreover, in the present embodiment, respective members are joined to one another by welding or the like. However, the same operational advantages can be obtained even by joining two members by a fastening member, such as a bolt.

INDUSTRIAL APPLICABILITY

The present invention relates to the bodyshell structure of the railcar and is especially applicable to the bodyshell structure of the railcar which requires the countermeasures to absorb the shock of the offset collision.

REFERENCE SIGNS LIST 1 bodyshell
2 underframe
5 corner post
7 end outside plate
11 side outside plate
12 side longitudinal member
13 side post
14 guiding plate
14c inclined portion
14d side plate joining portion
15 supporting plate
17 joining member
18 first supporting portion
18a contact surface
19 second supporting portion
19b contact surface

The invention claimed is:

1. A bodyshell structure of a railcar comprising:
side outside plates respectively located at both end portions of a carbody in a vehicle width direction; and
an end bodyshell including end outside plates respectively located at end portions of the carbody in a longitudinal direction and corner posts respectively located at four corners of the carbody and each joined to the adjacent side outside plate and the adjacent end outside plate, wherein
a front end portion of the side outside plate is covered with the corner post from an outer side in the vehicle width direction;
the corner post further includes an inclined portion which extends from the end outside plate to the outer side in the vehicle width direction and inclines rearward in the longitudinal direction toward the side outside plate; and
the inclined portion is located forward of the end outside plate in the longitudinal direction.

2. The bodyshell structure according to claim 1, further comprising:
a reinforcing member provided on an inner side of the side outside plate to reinforce the side outside plate; and
a joining member joined to the reinforcing member and the corner post to support the corner post from a rear side.

3. The bodyshell structure according to claim 2, wherein:
the joining member includes a first supporting portion joined to the corner post and a second supporting portion joined to the reinforcing member;
a joint surface of the first supporting portion and a joint surface of the second supporting portion are joined to each other; and
each of the joint surfaces is a flat surface extending in the vehicle width direction.

4. The bodyshell structure according to claim 1, wherein:
the corner post further includes a guide member having the inclined portion and a supporting member configured to support the guide member from a rear side in the longitudinal direction; and
the supporting member and the guide member constitute a closed cross-section structure including a closed space located between the supporting member and the guide member.

5. The bodyshell structure according to claim 1, wherein an inclined portion of the corner post projects forward of the end outside plate.

* * * * *